United States Patent [19]
Gillott

[11] Patent Number: 5,114,115
[45] Date of Patent: May 19, 1992

[54] DUAL INDEPENDENT INPUT HYDRAULIC SHUTOFF

[75] Inventor: Michael A. Gillott, Somers, Conn.

[73] Assignee: United Technologies Corporation, Hartford, Conn.

[21] Appl. No.: 572,839

[22] Filed: Aug. 27, 1990

[51] Int. Cl.$^5$ .................. F16K 31/124; F02C 7/232; F02C 9/26

[52] U.S. Cl. .................. 251/26; 60/39.281; 123/198 DB; 251/29

[58] Field of Search .............. 60/39.281, 734; 123/198 D, 198 DB; 251/26, 29; 137/625.64

[56] References Cited

U.S. PATENT DOCUMENTS

| | | | |
|---|---|---|---|
| 3,533,434 | 10/1970 | Smith | 251/26 |
| 3,613,375 | 10/1971 | Abild | 60/39.281 |
| 3,862,738 | 1/1975 | Stumpmeier | 251/26 |
| 4,010,606 | 3/1977 | Hansen | 60/39.281 |
| 4,229,937 | 10/1980 | Smith | 251/29 |
| 4,300,347 | 11/1981 | Smith | 60/39.281 |
| 4,449,359 | 5/1984 | Cole et al. | 60/39.281 |
| 4,493,187 | 1/1985 | Hansen | 60/39.281 |
| 4,602,479 | 7/1986 | Hansen | 60/39.281 |
| 4,926,815 | 5/1990 | Cowley | 123/198 DB |

Primary Examiner—George L. Walton

[57] ABSTRACT

In a fuel management system, shutoff means in a fuel supply line (12) closes when the pressure at a port (28) on the shutoff means exceeds some predetermined level. A most selector valve (42) attached to the port (28) connects to two electrically and mechanically independent shutdown valves (50, 52). Actuating either valve (50, 52) pressurizes the port (28), closing the shutoff means and stopping all flow through the supply line (12).

3 Claims, 3 Drawing Sheets

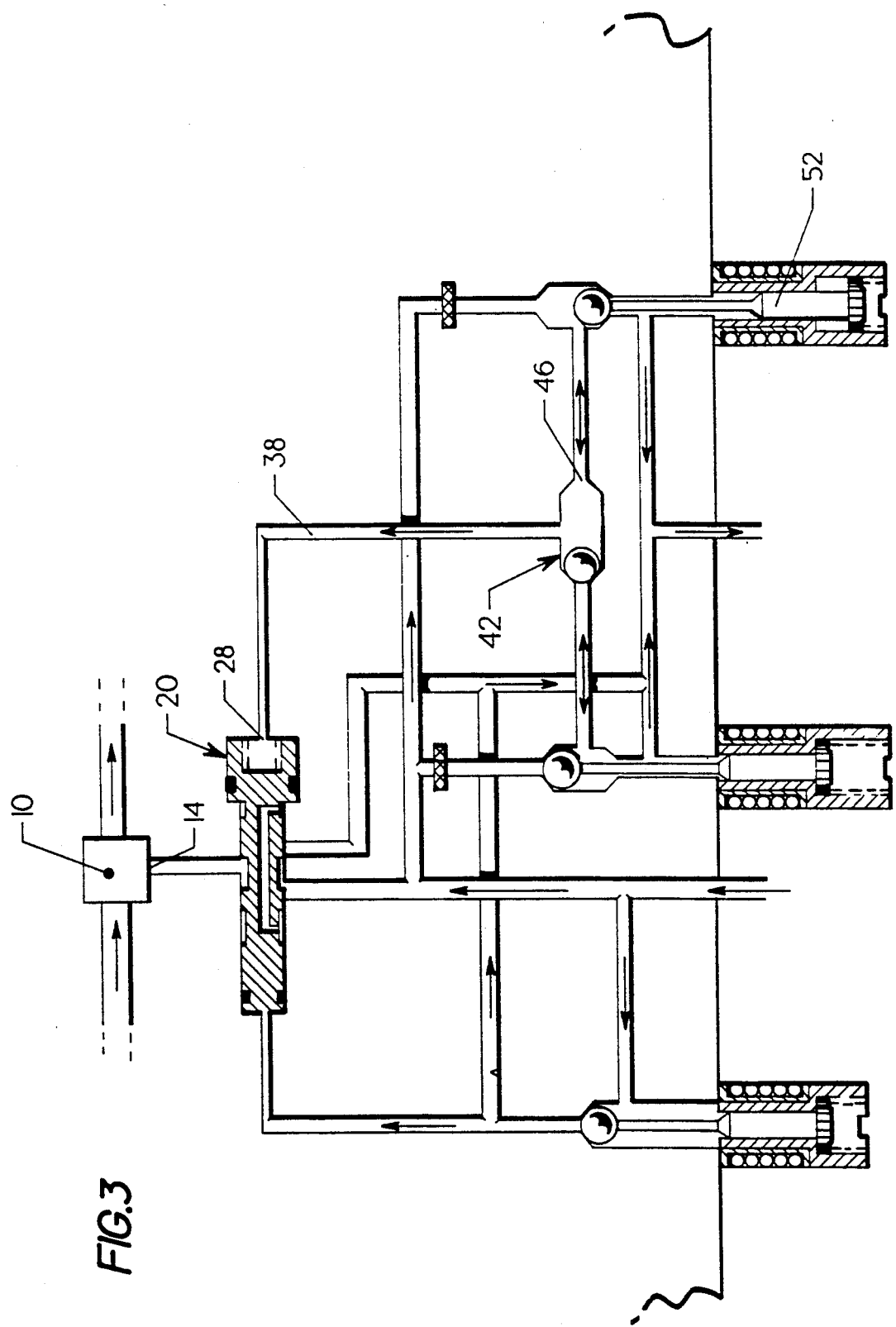

DUAL INDEPENDENT INPUT HYDRAULIC SHUTOFF

TECHNICAL FIELD

This invention relates to hydraulic circuits employing valves to regulate pressure and flow.

BACKGROUND ART

Fuel management systems for aircraft gas turbine engines control both fuel mass flow rate and pressure, maintaining demanded levels of engine performance over a broad range of operating conditions and environments. Should this range be exceeded, and to account for unforeseeable circumstances, these systems usually offer the capability to override some or all of these automatic controls. Typically, the most fundamental of these override safeguards is the one providing for shut down of all fuel flow to the engine injectors.

In most present systems, a shutoff valve located in the engine fuel line controls flow to the engine injectors. When the pressure applied at an actuation port located on this shutoff valve exceeds some predetermined pressure, the valve closes and all fuel flow stops. Conversely, when the pressure at the actuation port on the shutoff valve falls below this predetermined pressure, the valve opens. To control its pressure, the actuation port connects to an outlet of a sequencing valve having two inlets and two control ports. The first inlet connects to a fuel source with sufficient pressure to exceed the predetermined shutoff valve actuation pressure. The second inlet connects to the system drain, a low pressure source.

When high pressure is applied at the first control port, or run port, the outlet connects with the second inlet, venting the actuation port to the system drain and opening the shutoff valve. When the outlet connects to the second inlet in this fashion, a hydraulic latch inside the sequencing valve engages. With this latch engaged, the outlet will remain connected to the second inlet, regardless of the pressure applied at the run port. To disengage this latch, high pressure is applied at the second, or shutdown, port. When the latch disengages, the outlet connects to the first inlet, pressurizing the actuation port to close the shutoff valve.

To control the pressure at the run and shutdown ports, each connects to a two-position solenoid valve. When the shutdown solenoid valve energizes, high pressure is applied at the shutdown port. When the shutdown solenoid valve is de-energized, the shutdown port vents to the system drain. At all times, the run port vents, through an orifice in a vent line, directly to the system drain. When the run solenoid valve is energized, high pressure fuel is delivered to the run port. The size of the orifice in the vent line is selected to allow the high pressure fuel to flow into the system drain at a low rate. When the run solenoid subsequently de-energizes, high pressure fuel in the line supplying the run port bleeds to the drain through the vent line, venting the run port.

Before the engine fueled by the system is started, both the shutdown and the run solenoid valves remain de-energized. As both ports on the sequencing valve are therefore vented, high pressure fuel is delivered to the actuation port, keeping the shutoff valve closed. When the engine is to be started, the run solenoid valve energizes, pressurizing the run port. The sequencing valve then latches, opening the shutoff valve by venting the actuation port to the system drain. When the running engines are to be shut down, the shutdown solenoid valve energizes, pressurizing the shutdown port to disengage the hydraulic latch. With the hydraulic latch disengaged, high pressure fuel is delivered to the actuation port, closing the shutoff valve and stopping all fuel flow to the engines.

The foremost advantage of this type of system is that the mechanism that stops engine fuel flow is electrically and mechanically independent of the mechanism that starts it. Fewer components would be required if a single solenoid valve were used to control the pressure at the actuation port on the shutoff valve. With an electronic OR circuit, the shutdown and run commands could be reduced to a single signal that controls the state of this single solenoid valve. If all components perform as intended, this configuration functions identically to the aforementioned two-solenoid valve one, and a solenoid valve and sequencing valve are eliminated. However, should a single element fail in the single-solenoid valve system, fuel shutoff and run capability could be lost. In the two-solenoid valve system, due to isolation, at least two elements must fail in order to completely lose control of the shutoff valve, a much less probable occurrence.

DISCLOSURE OF INVENTION

Objects of the invention include providing capability in fuel management systems to stop fuel from flowing to engine injectors in response to commands from either or both of two electrically and mechanically independent inputs.

According to the present invention, two independent shutdown valves are connected to the inlets of a most selector valve such that, when either shutdown valve actuates, high pressure is delivered from the outlet of the most selector valve to a means, responsive to pressure, for stopping all fuel flow to the engine injectors.

The two-solenoid valve systems known to the prior art provide reliable fuel shutoff and run capability in aircraft installations with a single source of shutoff commands. As envisioned, many future installations will have two such sources, stopping fuel flow in response to either signals issuing from the cockpit, or commands from the electronic engine control unit. Shutting off fuel flow in response to either or both of two inputs using a system with a single shutdown solenoid valve is not possible if the inputs are to remain electrically and mechanically independent, as is often required.

By adding a second shutoff solenoid valve and a most selector valve to the system, the independence of the electrical shutdown signals is maintained. Furthermore, the requirement that the shutdown signals remain independent is satisfied without significantly altering the sequencing valve, shutoff valve, and run solenoid valve configuration, allowing the present invention to be implemented with only a minimal redesign of previous systems.

The foregoing and other objects, features, and advantages of the present invention will become more apparent in the light of the following detailed description of exemplary embodiments thereof, as illustrated in the accompanying drawings.

BRIEF DESCRIPTION OF THE DRAWINGS

FIG. 3 is a simplified schematic diagram of a second alternate state of the portion of the system according to the present invention.

BEST MODE FOR CARRYING OUT THE INVENTION

Figure 1:
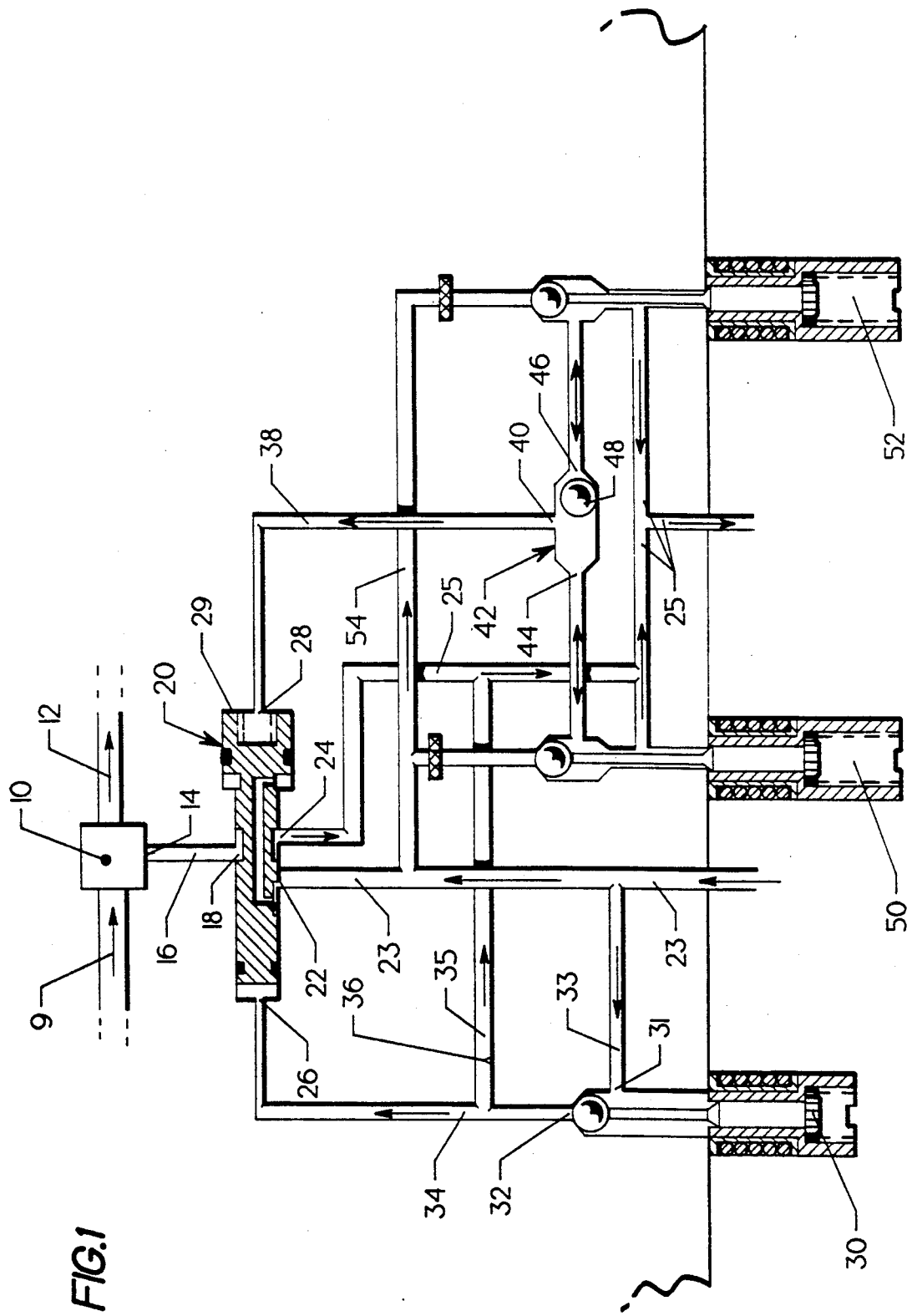
FIG. 1 is a simplified schematic diagram of a portion of a fuel management system according to the present invention.

Referring now to FIG. 1, high pressure fuel 9 flowing to an engine (not shown) passes through a shutoff valve 10 located in a fuel supply line 12. High pressure applied at an actuator port 14 on the shutoff valve 10 closes it, stopping fuel flow to the engines. The actuator port connects via a line 16 to an outlet 18 on a sequencing valve 20 having two inlets 22, 24 and two control ports 26, 28. The first inlet 22 connects to a high pressure fuel source (not shown) via a high pressure line 23. Typically, the pressure of this high pressure fuel source ranges from 400 to 1500 psig (2,800 to 10,300 k Pa). The second inlet connects 24 to a low pressure source, the system drain (not shown), via a low pressure line 25. Due to system drain back pressure, the pressure in the low pressure line 25 typically ranges from 60 to 250 psig (400 to 1,700 k Pa).

The pressure at each of the two control ports 26, 28 on the sequencing valve determines which of the two inlets 22, 24 connects to the outlet 18. When the second, or shutdown, port 28 is vented to the system drain, applying high pressure at the first, or run, port 26 connects the outlet 18 with the second inlet 24, venting the actuation port 14 to the system drain and opening the shutoff valve 10. When the outlet 18 connects to the second inlet 24 in this fashion, a hydraulic latch inside the sequencing valve 20 engages. With this latch engaged, the outlet 18 remains connected to the second inlet 24, irrespective of the pressure applied at the run port 26. Only high pressure applied at the shutdown port 28 disengages this latch, connecting the outlet 18 with the first inlet 22. High pressure is then supplied to the actuation port 14, closing the shutoff valve 10.

A two-position run solenoid valve 30 controls the pressure at the run port 26. The run solenoid valve 30 has a single inlet 31 and a single outlet 32. The inlet 31 connects, via a line 33, to the high-pressure line 23. The outlet 32 connects, via a line 34, to the run port 26. Another line 35, having an orifice 36, connects the line 34 supplying the run port 26 with the low-pressure line 25. When the run solenoid valve 30 is de-energized, the run port 26 vents through the orifice 36 to the system drain through the low-pressure line 25. When the run solenoid valve 30 energizes, high pressure fuel is supplied to the line 34 connecting the run port 26 to the run solenoid valve 30. The orifice 36 is sized to allow only a small amount of this high pressure fuel to flow into the low pressure line 25. When the run solenoid valve 30 subsequently de-energizes, pressurized fuel in the line 34 supplying the run port 26 bleeds away, venting the run port 26.

The shutdown port 28 on the sequencing valve 20 connects, via a line 38, to the outlet 40 of a most selector valve 42 having two inputs 44, 46. Unequal pressures applied at these inlets 44, 46 generates an unbalanced force on a poppet 48 inside the most selector valve 42. This unbalanced force drives the poppet 48 into the inlet with the lowest pressure, closing that inlet and preventing the higher pressure fluid from backflowing into the lower pressure inlet supply line. Once the poppet 48 has seated, only pressure from the higher pressure inlet communicates with the outlet 40. Should the pressures at the two inlets 44, 46 be equal, as shown in FIG. 1, the state of the poppet 48 is indeterminate. However, as there can be no backflow through either inlet 44, 46, and since the poppet 48 is constrained from seating in and plugging the outlet 40, the outlet pressure equals the two inlet pressures.

The first 44 and second 46 inlets of the most selector valve 42 connect, respectively, to first 50 and second 52 two-position shutdown solenoid valves. The first shutdow solenoid valve 50 actuates in response to cockpit-issued signals, and the second 52 in response to commands from an electronic engine control unit (not shown). Each shutdown solenoid valve 50, 52 connects to both the high pressure line 23, via a line 54, and the low pressure line 25. When a shutdown solenoid valve 50, 52 energizes, high pressure fuel is delivered to the respective inlet 44, 46 of the most selector valve 42. When a shutdown solenoid valve 50, 52 de-energizes, the respective inlet 44, 46 vents to the system drain.

Prior to engine operation, all three solenoid valves 30, 50, 52 are de-energized and the hydraulic latch in the sequencing valve 20 is not engaged. The actuator port 14 on the shutoff valve 10 is therefore pressurized and the shutoff valve 10 closed. To allow fuel to flow to the engine, the run solenoid valve 30 is energized long enough to ensure that the hydraulic latch in the sequencing valve engages. With the latch engaged, the actuator port 14 vents to the system drain, and fuel flows through the supply line 12.

Figure 2:
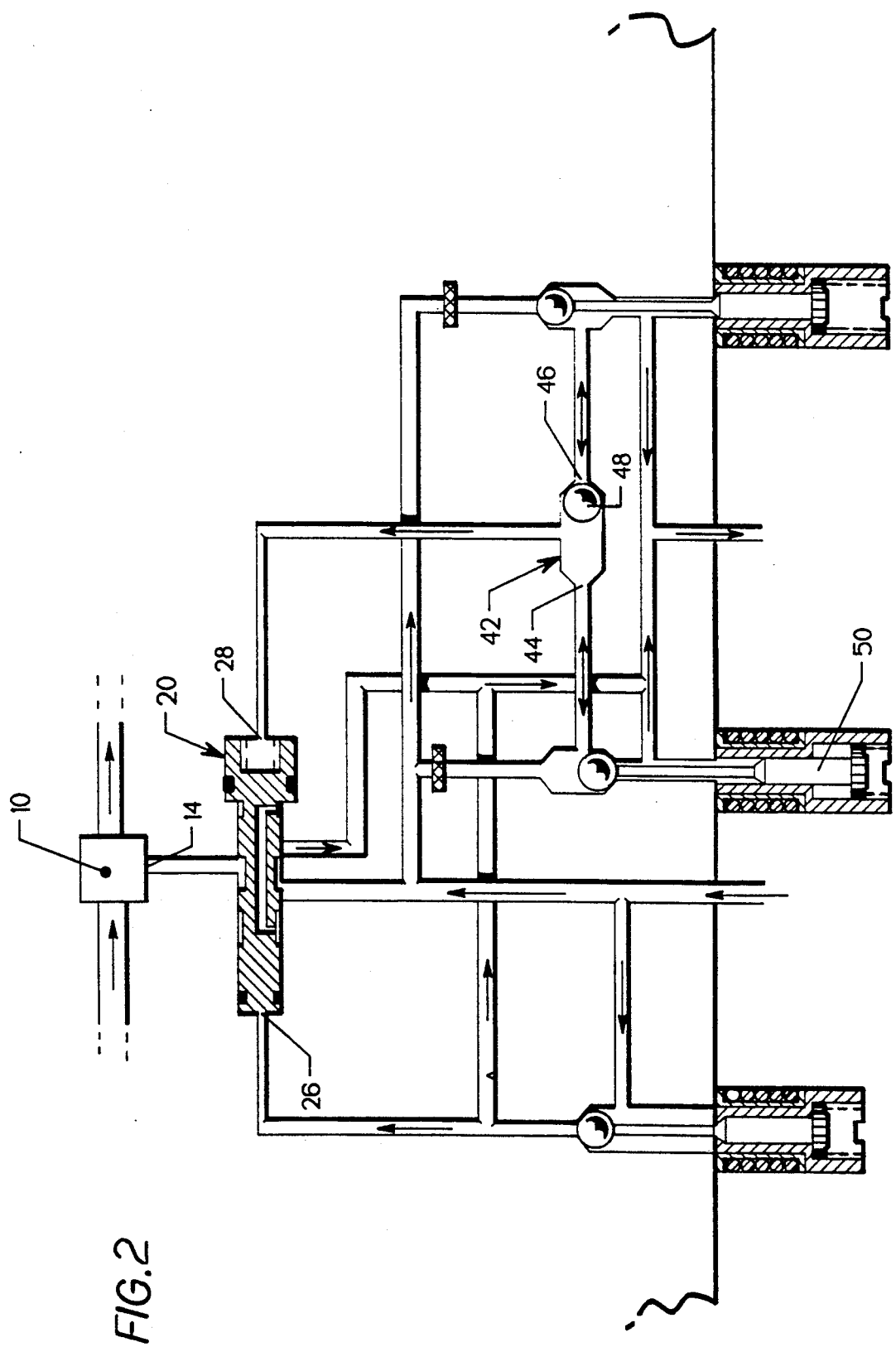
FIG. 2 is a simplified schematic diagram of a first alternate state of the portion of the system according to the present invention.

During engine operation, therefore, each of the three solenoid valves 30, 50, 52 are de-energized and the hydraulic latch in the sequencing valve 20 is engaged, as shown in FIG. 1. Referring now to FIG. 2, when a shutdown command issues from the aircraft cockpit, the first shutdown solenoid valve 50 energizes, delivering high pressure fuel to the first inlet 44 of the most selector valve 42. As the second inlet 46 remains vented to the system drain, the poppet 48 seats in the second inlet 46. High pressure fuel is therefore supplied at the second port 28 of the sequencing valve 20. As the run port 26 is vented, the hydraulic latch disengages. With the latch disengaged, high pressure fuel is supplied to the actuator port 14, closing the shutoff valve 10 and stopping all fuel flow to the engine.

Referring now to FIG. 3, in response to a command from the electronic engine control unit, the second shutdown solenoid valve 52 energizes, delivering high pressure fuel to the second inlet 46 of the most selector valve 42. Similar to the cockpit-issued shutdown command case, high pressure is then delivered to the second port 28 of the sequencing valve 20. This disengages the hydraulic latch, supplying high pressure fuel to the actuator port 14 and closing the shutoff valve 10.

It should be noted that the sequencing valve 20 and a spring 29 inside the sequencing valve 20, have been sized to disengage the hydraulic latch when either shutdown solenoid valve 50, 52 is energized, even if the run solenoid valve 30 is also energized.

Although the invention has been shown and described with respect to exemplary embodiments thereof, it should be understood by those skilled in the art that various changes, omissions and additions may be made therein and thereto, without departing from the spirit and scope of the invention.

I claim:

1. A flow line shutoff for a hydraulic management system having two independent shutoff command input sources, comprising:

a shutoff valve means disposed in said flow line a sequencing valve means, having a shutdown port, for controlling flow through said shutoff valve means line, said sequencing valve means operable between a first, open flow state and a second closed flow state in response to a selected pressure signal delivered to said shutdown port;

pressure selector means for selecting the control pressure signal by establishing exclusive fluid communication between the shutdown port and one of two input pressure signals, the selected input pressure signal having a fluid pressure greater than the deselected input pressure signal;

a first shutdown valve, actuatable between a first position and a second position, wherein said first position establishes exclusive fluid communication between a high pressure input signal and the pressure selector, and wherein said second position establishes fluid communication between a low pressure drain line and the pressure selector; and a second shutdown valve, actuatable between a first position and second position wherein said first position establishes communication between a high pressure input signal and the pressure selector means, and wherein said second position establishes fluid communication between a low pressure drain line and the pressure selector means.

2. The flow line shutoff as in claim 1 wherein said sequencing valve means comprises:

a sequencing valve having said shutdown port;

an outlet on said sequencing valve operable, responsive to pressure delivered to said shutdown port, between a first, high pressure state and a second, low pressure state;

a shutoff valve included in said flow line, said shutoff valve operable, responsive to pressure supplied to an actuator port on said shutoff valve, between a first, open flow state and a second, closed flow state; and means for supplying pressure from said sequencing valve outlet to said actuator port.

3. The flow line shutoff as in claim 1 wherein said first and second shutdown valves are actuated by corresponding first and second electric solenoids.

* * * * *